Figure 1:
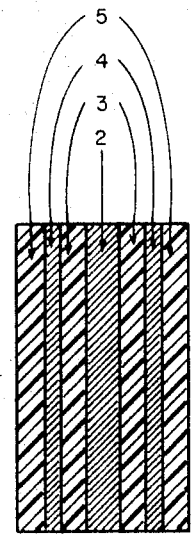

United States Patent

[11] 3,612,803

| [72] | Inventor | Ruth Elizabeth Barry Klaas<br>10 Oriole Drive, Wyomissing, Pa. 19610 |
|---|---|---|
| [21] | Appl. No. | 709,493 |
| [22] | Filed | Feb. 29, 1968 |
| [45] | Patented | Oct. 12, 1971 |
| | | Continuation-in-part of application Ser. No. 454,299, May 10, 1965, now abandoned. |

[54] FASTENING DEVICE
19 Claims, 4 Drawing Figs.

[52] U.S. Cl. .................................................. 219/10.53,
219/10.79, 219/10.41, 156/275
[51] Int. Cl. ..................................................... H05b 13/02,
H05b 9/02
[50] Field of Search .......................................... 219/10.53,
10.41, 10.49, 10.79, 19.10, 19.13, 201; 156/272,
380, 275

[56] References Cited
UNITED STATES PATENTS

| 2,241,312 | 5/1941 | Luty ............................. | 219/10.53 X |
| 2,372,929 | 4/1945 | Blessing ........................ | 219/10.53 X |
| 2,393,541 | 1/1946 | Kohler .......................... | 219/10.41 X |
| 3,359,398 | 12/1967 | Reinke et al. ................. | 219/10.29 X |
| 3,391,846 | 7/1968 | White ............................ | 219/10.41 X |
| 3,431,379 | 3/1969 | Yrene ............................ | 219/10.41 |
| 3,049,465 | 8/1962 | Wilkins ......................... | 156/275 |
| 3,175,383 | 3/1965 | Levine .......................... | 29/421 M |
| 3,535,481 | 10/1970 | Korb ............................. | 219/10.41 |

OTHER REFERENCES
Gage Theory & Application of Industrial Electronics, McGraw-Hill, 1951 pgs. 183 and 184.

*Primary Examiner*—J. V. Truhe
*Assistant Examiner*—L. H. Render

ABSTRACT: A fastening device is disclosed comprising at least one closed electrically conductive loop at least partially embedded in heat-activatable plastic material, activation of the plastic material being effected at an appropriate time by inducing alternating electrical current, in at least one closed electrically conductive loop in the fastening device, by means of a solenoid coil energized by alternating electrical current. The fastening device optionally may contain a ferromagnetic core enclosed within at least one electrically conductive loop and insulated therefrom, and the heat-activatable plastic material optionally may contain blowing agent. A method of adhering solid objects together by use of a fastening device of this type is also disclosed.

PATENTED OCT 12 1971　　　3,612,803

INVENTOR

Pastor Elizabeth Berry Klass

FASTENING DEVICE

This application is a continuation-in-part of application Ser. No. 454,299, filed May 10, 1065 and now abandoned.

This invention relates to a novel type of fastening, or adhesive, device designed to be used with an electric actuator, whereby the latent adhesive properties of the device are activated at the most appropriate time, frequently after the adhesive device has been placed in position between the solid objects to be adhered together. (In this specification and claims, the terms "fastening device" and "adhesive device" are generally used interchangeably, except where the context makes clear that the term "adhesive device" is intended to denote a fastening device wherein the fastening action is obtained at least in part by adhesive "stickiness" rather than by, for example, interlocking of solid articles of geometrical shapes adapted to produce such interlocking.) The combination of the novel adhesive device and the electric actuator disclosed in this specification has general utility in the aerospace, construction, furniture, metalworking, plastics, and other industries, but is especially useful in applications in which the objects to be adhered together are of such a nature so that the juncture zone between them is conveniently accessible only through a hole in one of the objects (as in "blind riveting").

In my Application for Letters Pat. Ser. No. 454,229, filed May 10, 1965, on "Radiation Converter," of which case the present disclosure is a continuation-in-part, a continuation of said Ser. No. 454,299 having been filed Mar. 14, 1968 and issued as U.S. Pat. 3,426,212 on Feb. 4, 1969. I disclosed in detail a device class for converting electromagnetic radiation of wavelength between about 2,900A. and about 15,000A. into electromagnetic radiation of different wavelength. Again, preferred embodiments of my invention as claimed in Application for Letters Pat. Ser. No. 454,299, now abandoned, of which case the present disclosure is a continuation-in-part, a continuation of said Ser. No. 454,299 having been filed Mar. 14, 1968 and issued as U.S. Pat. No. 3,426,212 on Feb. 4, 1969, while having some points of similarity with, are yet to be distinguished carefully from, processes for moving large quantities (e.g., more than a relatively few atoms or molecules) in the actual physical translation of macroparticles from one point to another, as, for example, the expansion of a dowel in a hole larger at the two ends than in the middle, the middle being a junction between two separate pieces, the dowel consisting of a central core of ferromagnetic material extending substantially from one end to the other end, an inner cylinder of substantially electrically nonconductive material surrounding the ferromagnetic core and adherent thereto, and an outer electrically conductive shell of epoxy resin containing blowing agent, dicyandiamide, and electrically conductive material such as graphite and/or metallic fibers, the said dowel being stable at ordinary temperatures until in effect it is made a single-turn secondary of a transformer by bringing a multiple-turns primary coil energized by an alternating electrical current close to, and oriented appropriately with respect to, the dowel, so that the dowel quickly heats up, expands to fill most or all of the hole, thereby joining the two separate pieces together, and then cures.

Prior to the present invention, a wide variety of expedients have been practiced to overcome the basic difficulties inherent in adhesives technology of the prior art. The difficulties can best be appreciated by reviewing the art as it stands in the technical literature (e.g., "Handbook of Adhesives," edited by Skeist, Reinhold Publishing Corp. New York, 1962), the technical bulletins of any manufacturer in this field e.g., "Thermogrip Hot Melt Adhesives and Applying Devices"; "New Thermogrip Wheel-Type Hot Melt Adhesive Applicator" (Bulletin TG24); "Variables of Use of a Hot Melt Adhesive System" (Bulletin TG5-67); "Thermogrip Model DXN Nozzle Type Hot Melt Adhesive Applicator"; "Thermogrip Model SFN Straight Feed Nozzle Type Applicator" (Bulletin TG-27); "Tape Closures with Thermogrip Adhesive Applicators"; "Thermogrip Model C2W Wheel-Type Hot Melt Adhesive Applicator"; "Thermogrip Adhesive 01165 and Adhesive 01194; all published by the United Shoe Machinery Corp. Boston, Massachusetts), the general patent literature of this field, and the art as it actually is practiced on automobile assembly lines, furniture plants, and elsewhere.

Typically, industrial use of adhesive is a "dirty," "messy" operation, with enormous losses in materials, unsatisfactory joints, health problems in operators using the adhesives, and other disadvantages. Practically all of these disadvantages stem from the fact that adhesives are sticky before they are actually used, unless special hotmelt, solvent-activated, or other type of activated adhesive is employed. The activated types of adhesives are difficult to use because they usually involve a critical timing problem, with effectiveness largely conditioned by proper timing of the interval between activation and application to the object(s) to be adhered together. So serious are these problems that almost ludicrous expedients are employed instead of adhesives in so-called "blind riveting" and similar situations wherein it would be convenient to use adhesives if their disadvantages in handling could be overcome: thus, the use of explosive rivets is sometimes mandatory, when the zone of juncture between two solid objects to be adhered together is conveniently accessible only by drilling a hole through one of the objects and at least part of the way through the other object.

All of these disadvantages the invention disclosed herein are overcome, provided that the objects to be adhered together have the proper geometry and magnetic susceptibility or lack thereof. My invention can be produced in many different modifications, including cord-type adhesives that can be metered out, through an appropriate device generally similar to those already used in the technology of hot metal adhesives, and the metered cord, in the form of small "dot"-type pieces or in longer "tape"-like cords, then activated separately when already in place on the object or substrate to be adhered to another object or objects.

In its simplest embodiment, my invention consists of a "blob" of heat-activatable adhesive containing a closed electrically conductive loop. When this loop is placed in a zone generally along the axis of a solenoid coil energized with alternating electrical current, with the general plane of the electrically conductive closed loop in the adhesive device generally perpendicular to the axis of the solenoid coil—that is, generally parallel to the planes of the individual turns of conductor in the solenoid coil—the system of the loop and solenoid in effect becomes an "airgap" transformer, with many turns in wire in the primary, or solenoid, coil, and only a single turn in the loop, or secondary, coil. In accordance with the electrical law applicable to transformers, a current of large amperage and low voltage is generated in the loop within the "blob" of heat-activatable adhesive; this current is transformed by the resistance of the loop into heat, and the heat activates the adhesive, making it sticky only when the exterior solenoid coil is energized with the appropriate character of alternating electrical current. The general principle of this type of system is utilized in the laboratory-model induction furnace sometimes seen in elementary physics laboratories, in which an iron-core transformer is fitted with a primary winding of several hundred turns, and a special secondary coil of only one turn consisting of a thick copper ring having a channel cross section; when a primary current of only 10 amperes is passed through the primary coil, a current of several thousand amperes is induced in the single-turn secondary, and the secondary becomes so hot that tin or lead can be melted easily on it. (See Black, "An Introductory Course In College Physics," Revised Edition, The MacMillan Company, New York, 1941.) The efficiency of the adhesive device of my invention can be improved, of course, by fitting it with a ferromagnetic core enclosed within the closed loop, and by enclosing a soft ferromagnetic material within the solenoid, so as to form an electromagnet. This general type of system works effectively even on heat-activatable adhesives as simple as asphalt, with loops as simple as ordinary bare wire, but when the adhesive device is fitted with a ferromagnetic core, it should be insulated from the closed electrically conductive loop in which it is desired to induce current for activation of the surrounding heat-activatable plastic material.

Unless otherwise specified herein, the meaning of the terms I use in this specification follow those of the pertinent art, and specifically as defined in "Handbook of Adhesives," edited by Skeist, Reinhold Publishing Corp. New York, 1962, and White, "Modern College Physics," Third Edition, D. Van Nostrand Company, Inc. Princeton, N. J., 1956. Thus, to those versed in the art, it will be clear that I mean, by the term "heat-activated adhesive" an adhesive material that is changed in a major way on exposure to heat, and that generally the change effected by heat is a change from a nonsticky state to a sticky state, and ultimately, in many cases at least, to an essentially cured state.

In actual practice, an extremely wide variety of plastic materials, electrically conductive loops, electric actuators, and the like may be employed in the practice of my invention.

The basic principle employed in all such embodiments, however, can be best appreciated by reference to the accompanying drawing, which shown a dowel according to my invention, especially designed to hold two pieces of aluminum metal together, as in an aerospace vehicle.

Figure 2:
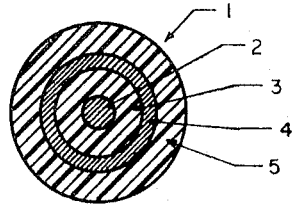
Figure 3:
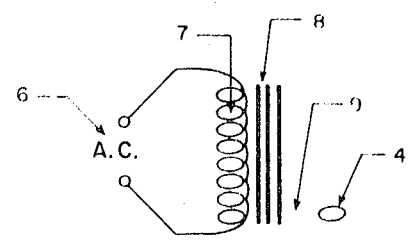
Figure 4:
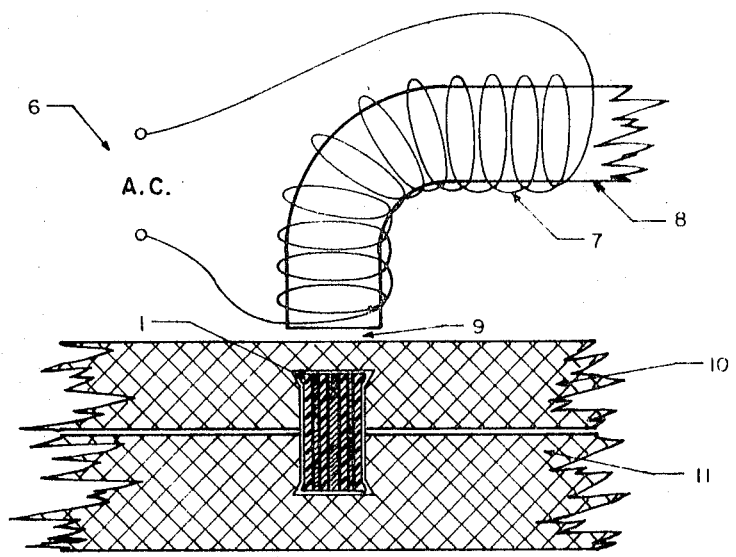

In FIGS. 1 and 2, it is shown that a heat-activatable adhesive device may be fabricated by coating an electrically conductive shell around a ferromagnetic core insulated from the conductive shell by insulative resin, and additional resin may be coated on top of the electrically conductive shell, or the shell may be metal fabricated or wrapped around the central insulated ferromagnetic core 2, insulated electrically by means of nonconductive substance 3 from an electrically conductive loop 4, which may be coated with additional resin or adhesive 5 optionally containing blowing agent. In one preferred embodiment, the ferromagnetic core 2 may be a soft iron wire or mixture of resin and soft carbonyl iron particles, the electrically insulative shell 3 may be an epoxy resin containing curing agent requiring temperatures well above 200° F. for rapid cure, the electrically conductive shell 4 may be epoxy resin filled with sufficient metal fibers, graphite, and/or acetylene black to have substantial electrical conductivity, and also containing curing agent, and finally the optional outer sheet 5 may be additional epoxy resin containing curing agent and optionally a blowing agent activated by heat. This adhesive device may be activated by placing its axis (i.e., the direction perpendicular to the general plane of the electrically conductive loop) along the general axis of one end of a solenoid 7 energized by alternating current source 6, and containing a ferromagnetic core 8, as long as no material of substantially significant thickness and/or magnetic susceptibility is interposed between the adhesive device and the actuator consisting of the solenoid coil. If it is desired to stick together two sheets of aluminum 10 and 11, the adhesive device is placed into a space between the two sheets, the hole in each sheet preferably being of larger diameter at depth in the metal than it is on the surface, the sheets clamped together briefly, and the device is activated by energizing the solenoid with alternating electric current. FIG. 3 shown an electrical diagram of the "airgap"/iron-core transformer thereby established, and FIG. 4 gives a cross-sectional view of the system. Current induced in the electrically conductive shell 4 causes the resin or plastic material of heat-activatable nature in the dowel to react, get sticky, and cure; if there is blowing agent in shell 5, or if sheet 4 is soft and easily deformable such as a graphite-filled resin composition may be, if there is blowing agent in sheet 3 and/or shell 4 and/or shell 5, the heat activation effected by the loop will cause the blowing agent to expand the dimensions of the dowel and fill out the entire cavity between the bodies to be adhered together and also such indentations or holes that may be in the bodies and adjacent to the dowel. An automatic cutoff of power may be built into the dowel by wrapping with perforated foil used as conductive shell 4, so that the foil ruptures at several or one point during the blowing step, and no longer forms a continuous loop. On colling and curing, a tight bond is formed between the two objects to be adhered together. Usually, it will be preferable to make the "airgap" 9 as small as possible, and in any event not to fill it with a sheet of ferromagnetic material greatly larger than the diameter of the coil or loop or both, and oriented in such a manner as to cut the continuity of the lines of magnetic force tending to pass from the core of the solenoid to the core of the adhesive device. A C-shaped solenoid may sometimes be employed, with the dowel filling most of the gap in the "C" shape, and with the lines of magnetic force passing through the core of the solenoid, out through an "airgap" to the core of the dowel, through the core of the dowel, through an "airgap" on the other side of the dowel, and into the other arm of the C-shaped solenoid, thereby describing a closed-loop path.

In industrial uses, it is possible to arrive at this geometry by employing a plierslike device for actuating the dowel; the handles of the pliers optionally may be of material of low magnetic susceptibility, while the jaws of the pliers are wound with a solenoid so as to form a "C" configuration; the same tool used to clamp two objects together during activation of the adhesive device may then be employed to induce electrical current in the device and thus heat activate it.

It should be noted that only one loop need be employed in a single adhesive device, although a plurality of loops could be employed; also, a wrap of a low number of turns along the axis of the dowel could be employed, as long as the coil thereby formed could be closed into a single electrical loop.

It should also be noted that the physical form of my invention can be varied widely, from rigid dowels to cordlike adhesives having an iron-powder resin core, said cordlike adhesives being readily cut into dots of adhesives activatable on application between sheets of paper and the like, on automatic machinery generally similar to that described in the technical bulletins common in the heat-activated adhesives industry. The adhesive can be applied at one step in such a procedure, and activated at a later step by exposing it to the appropriate type of pulsating magnetic field such as may be obtained from a solenoid or electromagnet energized with alternating electrical current. Even tapes may be made with this principle, by printing closed loops of electrically conductive substance on the heat-activatable base; activating machinery may consist of wheels having spokes wound with solenoids, and so arranged so as to "register" properly with the printed loops on the tape; activating wheels of this nature could be placed both above and below the dots if such dots (adhesive devices) each comprising a printed electrically conductive loop and optionally a printed ferromagnetic core electrically insulated from the electrically conductive loop. Many other variations of my invention are possible, and will readily occur to those versed in the adhesive art, and especially in the art of hotmelt (heat-activated) adhesives when provided with the benefit of this disclosure.

The manufacture of adhesive devices of this invention is quite simple, since the only geometry required in the device is that no part of the adhesive to be activated by heat should be excessively remote from the electrically conductive loop or loops in the adhesive device, and the loop must be electrically insulated, for best results, from the ferromagnetic core, if such core is used. I have found it possible to make dowels of the adhesive-device design of this invention by simply dipping long soft iron wires in a tank of epoxy resin/curing agent having a melting point of about 100° F. but a curing temperature above 160°F., said epoxy resin/curing agent combination being at a temperature around 110° F; next, cooling; next, dipping in a tank of such epoxy resin/curing agent filled with sufficient metal fibers and/or graphite to be substantially electrically conductive; next, cooling; next, dipping in a tank of such epoxy resin/curing agent containing a blowing agent having a blowing temperature well above 130° F; next, cooling; and finally cutting the dowels to the appropriate length. A generally similar process may be employed to manufacture cordlike adhesive device of this invention, but designed to be cut into dots or lengths at or near the point of use; in manufacturing such cordlike adhesive, an extruded cord of relatively high heat resistance, good flexibility, and substantially filling with ferromagnetic particles is employed in place of the soft iron wire mentioned above.

Heat-activatable plastic materials useful in the practice of my invention include a wide variety of materials, with special utility noted for adhesive devices comprising one or more of the following materials in the plastic material portion of the device: properly formulated asphalt; polyvinyl chloride compositions; plastic material containing isocyanate groups (i.e., polyurethane resins and/or certain precursors thereof); epoxy resin formulations; silicone resins; polystyrene compositions; certain phenolic compositions; acrylic compositions; and many other types of compositions. It should be clearly understood that not all of the classes of resins set forth above are ideal for any one application, and in any event, best results or indeed satisfactory results will be obtained by proper formulation with other ingredients, all according to rules and procedures well known in the art for the type of shelf life and heat activation requirements necessary for economic use of my invention. It should also be noted that heat-activated plastic materials other than the specific materials mentioned above are workable, when properly formulated, although some may not have characteristics as good as others for the end uses intended.

The basic chemistry and formulation know-how required to practice my invention are well known, and to those versed in the general art of adhesives and polymers generally, there will be no difficulty in formulating materials that will work satisfactorily in the fabrication and use of my invention. The general technology of adhesives is reviewed in the "Handbook of Adhesives," edited by Skeist, Reinhold Publishing Corp. New York, 1962; the general technology of polymers is reviewed in Billmeyer, "Textbook of Polymer Science," John Wiley & Sons, Inc. New York, 1962. The general principles of filling plastics with graphite or metal fibers of such like to make electrically conductive compositions, and of filling plastics with ferromagnetic particles to make magnetically susceptible compositions, are reviewed in detail in Delmonte, "Metal-Filled Plastics," Reinhold Publishing Corp. New York, 1961. The general principles of incorporating blowing against in plastics so as to expand ("foam") them on activation by heat are set forth in detail in Ferrigno, "Rigid Plastics Foams," Reinhold Publishing Corp. New York, 1963. Those wishing to make iron-filled ferromagnetic/plastic compositions should fill the plastic with from about 10 to about 70 percent by volume of a soft iron particle, such as carbonyl iron, in accordance with the Delmonte reference cited above (pp. 169-200) and U.S. Pat. No. 2,238,893 Apr. 21, 1941). Those wishing to make electrically conductive plastic should fill the plastic with at least about 30 to perhaps somewhat above 70 percent by volume of electrically conductive substance, such as metal fibers, acetylene black, graphite, or such like, in accordance with the teachings of Delmonte reference cited above (pp. 147-168) and the following: Collings and Beverton, U.S. Pat. No. 2,444,034 (June 29, 1948); Japanese Pat. No. 6733 (August 1959); Coler, U.S. Pat. No. 2,761,849 and 2,761,854 (September 4, 1956); *Elec. Mfg., 44,* 60 (November 1949).

Probably the most useful of the commercially important plastics are the polyurethanes and the epoxy resins. The general technology of polyurethanes is reviewed in detail in Dombrow, "Polyurethanes," Reinhold Publishing Corp. New York, 1957; special reference is made to pages 26 and 27 of this book, where there is set forth the methods of making and using so-called "hindered isocyanates," for the plastic used in my invention should have storage stability over long periods of time at room temperature, but cure quickly when activated by heat. (See also pages 106-133 and pages 29-74 of the Dombrow reference cited, pages 1-138 of the Ferrigno reference cited, and the discussion of delayed-action, one-part polyurethane systems in Reilly and Zwolinski, ASTIA, GMI Report No. 2258 Jan. 22, 1962).) Epoxy resins useful in the practice of this invention normally are systems containing so-called "-slow" curing agents, such as aromatic amines or acid anhydrides: see "Epoxy Resins," as reviewed at pages 294-312 inclusive of the Kirk-Othmer "Encyclopedia of Chemical Technology," Second Edition, Vol. 8, John Wiley & Sons, Inc. New York, 1965. Butylated urea-formaldehyde, melamine-formaldehyde, and/or novolac resins are also useful in heat-curable epoxy systems. Moreover, epoxy resins may be readily formulated into foaming systems, by the inclusion of appropriate blowing agent; a very simple type of foaming epoxy may be formulated, for example, from epoxy resin and diaminodiphenylsulfone, this formulation appears to have excellent stability at room temperature, but cures rapidly at temperatures in the range of 300°-400° F. In the case of epoxy, polyurethane, and indeed almost all types of resins useful in the practice of my invention, the viscosity, consistency, or "-hardness" of the adhesive device may be controlled by adding appropriate fillers, such as colloidal silica, or otherwise. Resilience may be built into especially the epoxy-type foams by including in the formulation amine-terminated polyamide resins. (See also Pollack and Zahn, Materials in Design Engineering, 54, 14 (1961); Burge, Landua, and Toohy, SPE Regional Technical Conference, Buffalo, N.Y. 87 Oct. 5, 1961); and Ferrigno reference already cited, pages 212-223.)

Simple thermoplastic materials are operative in the practice of my invention, as well as complicated thermosetting resin systems, as will be well understood by those versed in the art and provided with the benefit of this disclosure. Thus, asphalt may be blown with sodium bicarbonate and stearate surfactant (Pordes, U.S. Pat. No. 2,901,369; Ferrigno reference cited above, pages 250-253); foaming phenolic formulations are generally known (see Ferrigno reference, page 235), although they may have to be stored at 45° F. or lower for adequate shelf life stability; even urea-formaldehyde resins could be used under extremely closely controlled conditions of temperature and catalysis; acrylics could have limited utility (see Ferrigno reference, page 251; British Pat. 806,159; U.S. Pat. No. 2,684,341); silicone-based devices would be of special utility at high temperatures (see Ferrigno reference already cited, pages 244-247; British Pats. 788,598 and 788,599); and the literature is replete with formulations of blowable heat-activated thermoplastics such as expandable polystrene and copolymers of polystyrene, with such blowing agents as low-boiling hydrocarbons, azodiisobutyronitrile, or the like (see Ferrigno reference, pages 139-211 incl.; Bailin, SPE Technical Papers, SPE Regional Technical Conference, Buffalo, N.Y. 127 Oct. 5, 1961); Edberg and Immel, U.S. Pat. No. 2,998,501; Klink and Justin, U.S. Pat. No. 3,060,513) and formulations such as the rigid polyvinyl chloride foam recipe adapted from Fuller, Ind. Eng. Chem., 49, 722 (1957) produced by cold blending 100 parts by weight of polyvinyl chloride dispersion-grade resin, 10 parts of dibasic lead phosphite stabilizer, and 5 to 25 parts of a 70/30 mixture of N,N'-dimethyl-N,N'-dinitrosoterephthalamide white mineral oil mixture. (See Ferrigno reference cited, pages 226-227.) Other heat-activatable formulations will readily occur to those versed in the art and provided with the benefit of this disclosure. (See U.S. Pat Nos. 3,104,979; 3,132,119; 3,100,760; 3,100,754; 3,063,958; 3,118,858; and 3,124,548.) Mechanical appliances useful in the practice of this invention will also readily occur to those versed in the art and provided with the benefit of this disclosure; thus, a drill or auger, fitted with an internal shaft slidable within a sleeve forming the main cutting screw of the auger, would have utility as a means of pushing or pulling a knifelike short lever mounted on the cutting end of the auger bit and fulcrumed on the sleeve in such a manner so that pushing or pulling on it could change its lengthwise direction from a direction generally parallel to that of the auger bit to a direction more nearly perpendicular to the axis of the auger bit, and thus effectively increasing the diameter of the hole being drilled by the auger at any time desired during the drilling process.

It is not desired to limit my invention to the exact compositions, processes, and device designs described, but rather I intend to include in the scope of my claims such minor modifica-

I claim:

1. A fastening device comprising, in combination, heat-activatable plastic material, at least one closed electrically conductive loop, and ferromagnetic material, said closed electrically conductive loop being at least partially embedded in said heat-activatable plastic material, at least part of said ferromagnetic material being enclosed within said electrically conductive loop, said ferromagnetic material being electrically insulated from said closed electrically conductive loop.

2. A fastening device according to claim 1, in which the heat-activatable plastic material contains blowing agent.

3. A fastening device according to claim 1, in which the heat-activatable plastic material contains blowing agent.

4. A fastening device according to claim 1, in which the heat-activatable plastic comprises asphalt.

5. A fastening device according to claim 1, in which the heat-activatable plastic material comprises polyvinyl chloride.

6. A fastening device according to claim 1, in which the heat-activatable plastic material contains isocyanate groups.

7. A fastening device according to claim 1, in which the heat-activatable plastic material comprises epoxy resin.

8. In combination, an adhesive device according to claim 1, and a solenoid coil of geometry and electrical characteristics such that passage of alternating current through said coil appropriately oriented near said adhesive device induces electrical current, in at least one closed electrically conductive loop in said adhesive device, sufficient to produce enough heat to activate at least part of the plastic material in said device.

9. A fastening system for joining objects together which comprises:
 a. an electric transformer comprising an adhesive device according to claim 1 and at least one solenoid coil having geometry and electrical characteristics such that passage of alternating electrical current through said coil induces electrical current, in at least one closed electrically conductive loop of said adhesive device, sufficient to produce heat to activate at least part of the plastic material in said adhesive device; and
 b. electricity-generating means electrically connected to said solenoid coil so as to form a complete electrical circuit, said electricity-generating means forcing alternating current through said solenoid coil.

10. A fastening system for joining objects together which comprises:
 a. an electrical transformer comprising an adhesive device according to claim 2 and at least one solenoid coil having geometry and electrical characteristics such that passage of alternating electrical current through said coil induces electrical current, in at least one closed electrically conductive loop of said adhesive device, sufficient to produce heat to activate at least part of the plastic material in said adhesive device; and
 b. electricity-generating means electrically connected to said solenoid coil so as to form a complete electrical circuit, said electricity-generating means forcing alternating current through said solenoid coil.

11. A fastening device according to claim 2, in which the heat-activatable plastic material comprises silicone resin.

12. A fastening device according to claim 3, in which the heat-activatable plastic material comprises polystyrene resin.

13. A fastening device according to claim 3, in which the heat-activatable plastic material comprises phenolic resin.

14. A fastening device according to claim 3, in which the heat-activatable plastic material comprises polyurethane resin.

15. A fastening device according to claim 3, in which the heat-activatable plastic material comprise epoxy resin.

16. A fastening device according to claim 3, in which the heat-activatable plastic material comprises polyvinyl chloride.

17. In combination, an adhesive device according to claim 3, and a solenoid coil of geometry and electrical characteristics such that passage of alternating current through said coil appropriately oriented near said adhesive device induces electrical current, in at least one closed electrically conductive loop in said adhesive device, sufficient to produce enough heat to activate at least part of the plast material in said device.

18. A fastening system for joining objects together which comprises:
 a. an electrical transformer comprising an adhesive device according to claim 3 and at least one solenoid coil having geometry and electrical characteristics such that passage of alternating electrical current through said coil induces electrical current, in at least one closed electrically conductive loop of said adhesive device, sufficient to produce heat to activate at least part of the plastic material in said adhesive device; and
 b. electricity-generating means electrically connected to said solenoid coil so as to form a complete electrical circuit, said electricity-generating means forcing alternating current through said solenoid coil.

19. A fastening system for joining objects together which comprises:
 a. an electrical transformer comprising a primary winding ferromagnetic material, and at least one secondary winding, said secondary winding constituting a closed electrical circuit of electrically conductive material at least partially embedded in heat-activatable plastic material, at least part of said ferromagnetic material being embedded within said secondary winding, and said primary winding and said secondary winding having geometry and electrical characteristics such that passage of alternating current through said primary winding induces electrical current sufficient to produce heat, substantially by electrical resistance heating, to activate at least part of said heat-activatable plastic material; and
 b. electricity-generating means electrically connected to said primary winding so as to form a complete electrical circuit, said electricity-generating means forcing alternating current through said primary winding.